United States Patent
Rathinasamy et al.

(10) Patent No.: US 11,677,205 B2
(45) Date of Patent: Jun. 13, 2023

(54) METHOD FOR MOVING CABLES BETWEEN DEVICES

(71) Applicant: Dell Products L.P., Round Rock, TX (US)

(72) Inventors: Shree Rathinasamy, Round Rock, TX (US); Kannan Karuppiah, Fremont, CA (US); Neal Beard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 17/373,966

(22) Filed: Jul. 13, 2021

(65) Prior Publication Data

US 2023/0013300 A1 Jan. 19, 2023

(51) Int. Cl.
*H01R 43/26* (2006.01)
*G06F 1/18* (2006.01)

(52) U.S. Cl.
CPC ............ *H01R 43/26* (2013.01); *G06F 1/181* (2013.01)

(58) Field of Classification Search
CPC .. H01R 43/26; H01R 13/516; H01R 13/6215; G06F 1/181; Y10T 29/49147; Y10T 29/49174
See application file for complete search history.

(56) References Cited

U.S. PATENT DOCUMENTS

| | | | |
|---|---|---|---|
| 6,343,950 B1 * | 2/2002 | Eginton | H01R 13/516 439/157 |
| 6,857,900 B2 * | 2/2005 | Kleeberger | H01R 13/6215 439/701 |
| 9,578,401 B2 * | 2/2017 | Lawson | G02B 6/3825 |
| 2010/0267251 A1 * | 10/2010 | Phu | H01R 31/06 439/49 |

* cited by examiner

*Primary Examiner* — Donghai D Nguyen
(74) *Attorney, Agent, or Firm* — Joseph Mencher

(57) ABSTRACT

An inter-device cabling movement system includes a base and a plurality of cable attachment devices that extend from the base in a port identification sequence. Each of the plurality of cable attachment devices includes a cable engagement element that is configured to engage a respective cable, and a cable securing element that is configured to secure the cable engagement element to the respective cable. The cable engagement elements and cable securing elements may be utilized to secure each cable attachment device to respective cables connected to first ports on a first device so that those respective cables may be disconnected from the first pots on the first device and reconnected to second ports on a second device based on the port identification sequence.

7 Claims, 16 Drawing Sheets

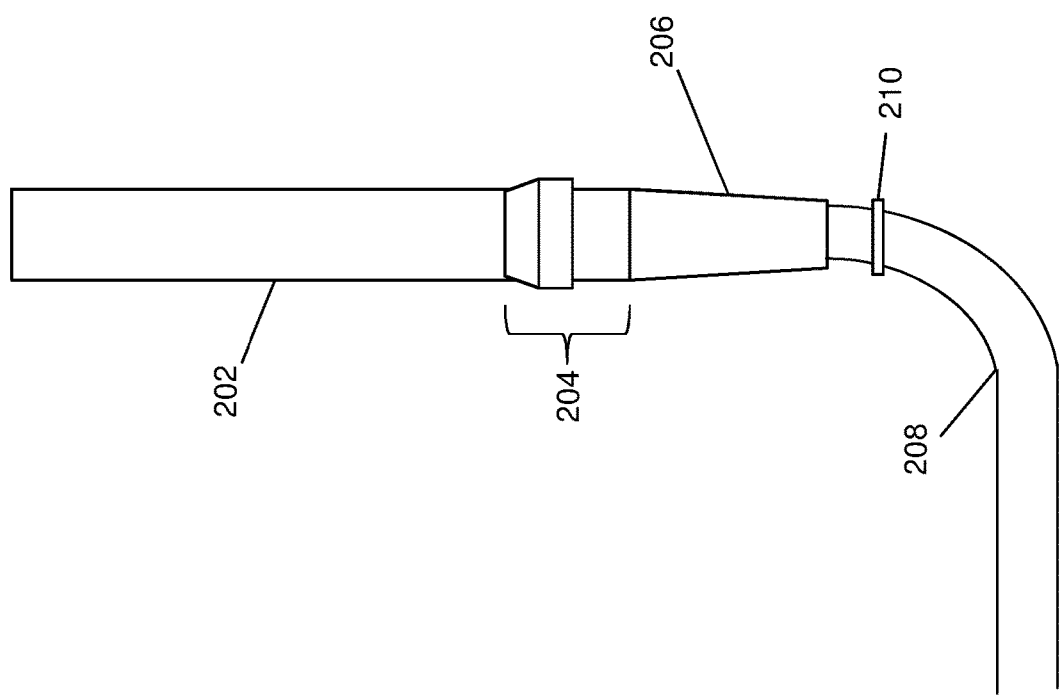

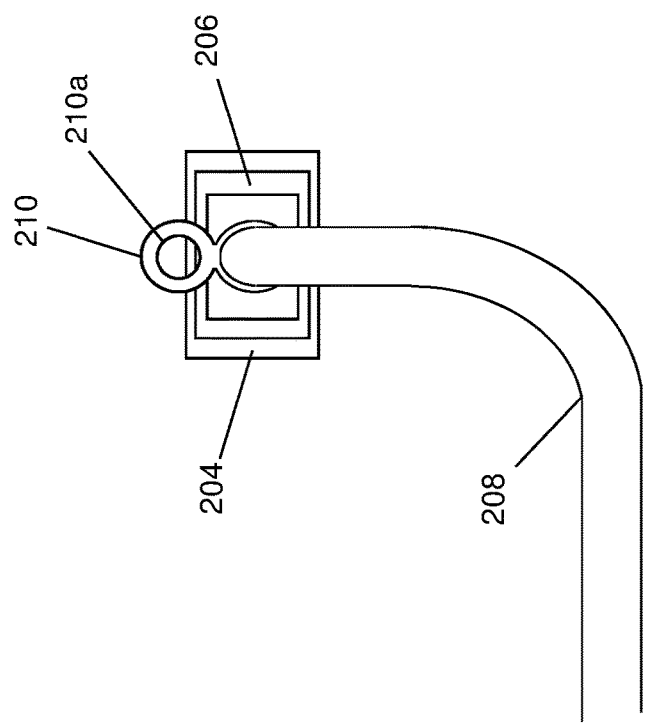

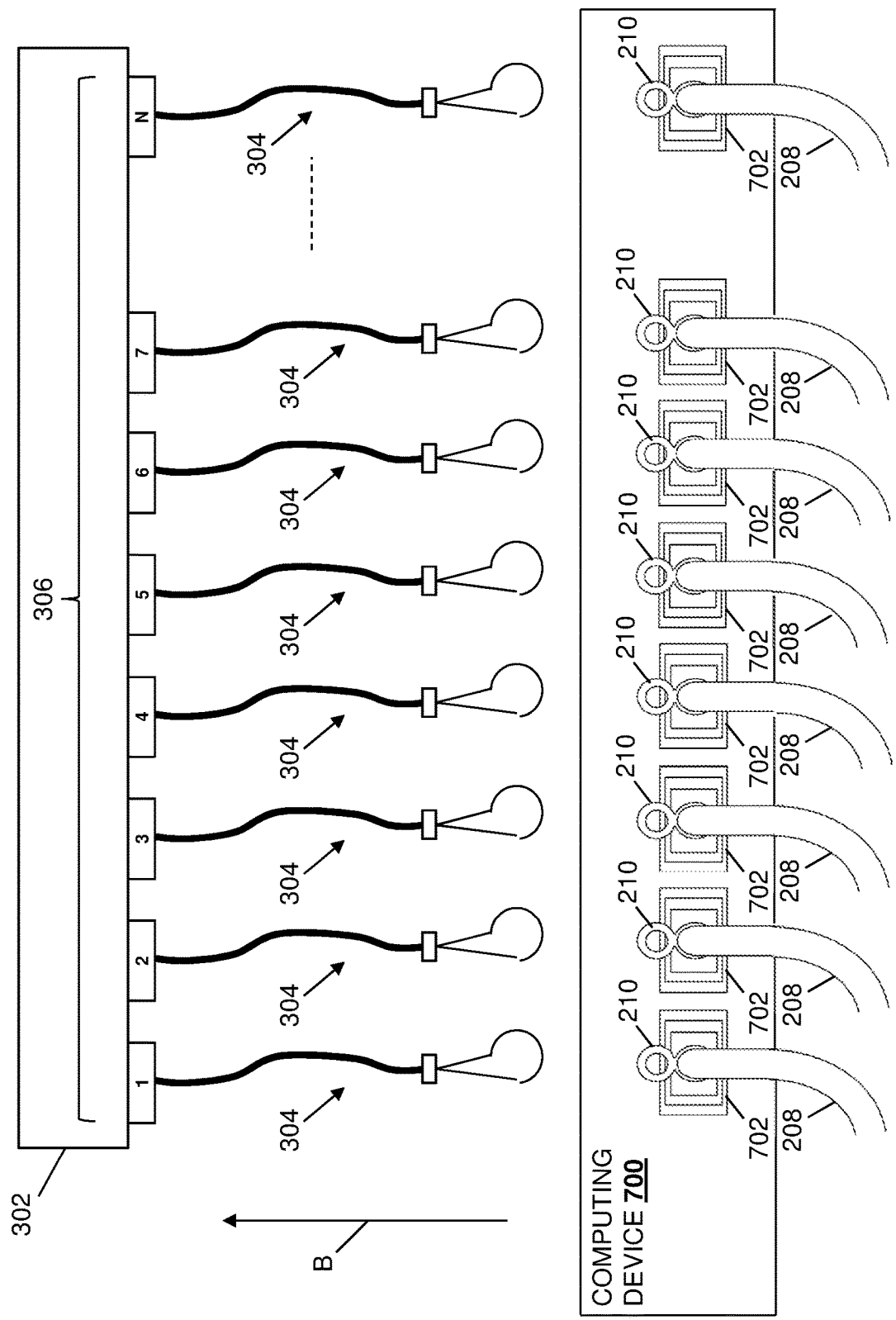

METHOD FOR MOVING CABLES BETWEEN DEVICES

BACKGROUND

The present disclosure relates generally to information handling systems, and more particularly to moving cabling between information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, typically include cabling connecting to multiple ports on that switch devices. For example, Top of Rack (ToR) switch devices in racks in a datacenter include multiple ports, and each of those ports may be connected to a respective cable that may be further connected to server devices, other networking devices, storage systems, and/or other computing devices known in the art that may be located in the rack with that ToR switch device or in other racks in the datacenter. As such, a relatively large number of cables may be connected to the ports on any particular ToR switch device (e.g., a respective cable may be connected to each of 32 ports on a conventional ToR switch device), and in the event of the failure or other unavailability of that ToR switch device, that unavailable ToR switch device must be replaced. As will be appreciated by one of skill in the art in possession of the present disclosure, the replacement of such an unavailable ToR switch device requires each of the cables connected to that unavailable ToR switch device to be disconnected from its respective port on that unavailable ToR switch device, and reconnected to a corresponding port on the replacement ToR switch device, which can raise some issues.

Conventionally, the movement of cables between an unavailable ToR switch device and a replacement ToR switch device may be facilitated by labeling each of the cables connected to the unavailable ToR switch device with a sticker that identifies which port on the unavailable ToR switch device it is connected to, and one of skill in the art will appreciate how the lack of such labeling greatly complicates the process of reconnecting the cabling to corresponding ports on the replacement ToR switch device. However, such conventional labeling solutions often mislabel the location of cables (e.g., during the labeling process), which results in cable(s) being connected to the wrong port(s) on the replacement ToR switch device. Solutions to such labeling issues are to utilize Link Layer Discovery Protocol (LLDP) techniques to verify connections and move cabling between the unavailable ToR switch device and the replacement ToR switch device, but such solution are time consuming and increase operational costs. In most conventional systems, network administrators generate a blue print for the ToR switch device cabling connections and provide that blue print to field engineers who make the physical cable/ToR switch device connections using the techniques discussed above, followed by the network administrators confirming that those cable/ToR switch device connections are correct, which is also a time-consuming process requiring relatively high degrees of coordination. The issues associated with conventional inter-device cabling movement discussed above are exacerbated when multiple devices must be replaced.

Accordingly, it would be desirable to provide an inter-device cabling movement system that addresses the issues discussed above.

SUMMARY

According to one embodiment, an Information Handling System (IHS) includes a chassis; a plurality of ports on the chassis; a respective cable that is connected to each of the plurality of ports; and an inter-device cabling movement system, comprising: a base; and a plurality of cable attachment devices that extend from the base in a port identification sequence corresponding to the plurality of ports, wherein each of the plurality of cable attachment devices includes: a cable engagement element that is configured to engage one of the respective cables; and a cable securing element that is configured to secure the cable engagement element to the one of the respective cables.

BRIEF DESCRIPTION OF THE DRAWINGS

FIG. 2A is a schematic top view illustrating an embodiment of a cable.

FIG. 2C is a schematic rear view illustrating an embodiment of the cable of FIGS. 2A and 2B.

FIG. 7C is a schematic view illustrating an embodiment of the inter-device cabling movement system of FIGS. 3A and 3B disconnected to the cables of FIG. 6A that are connected to the second computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
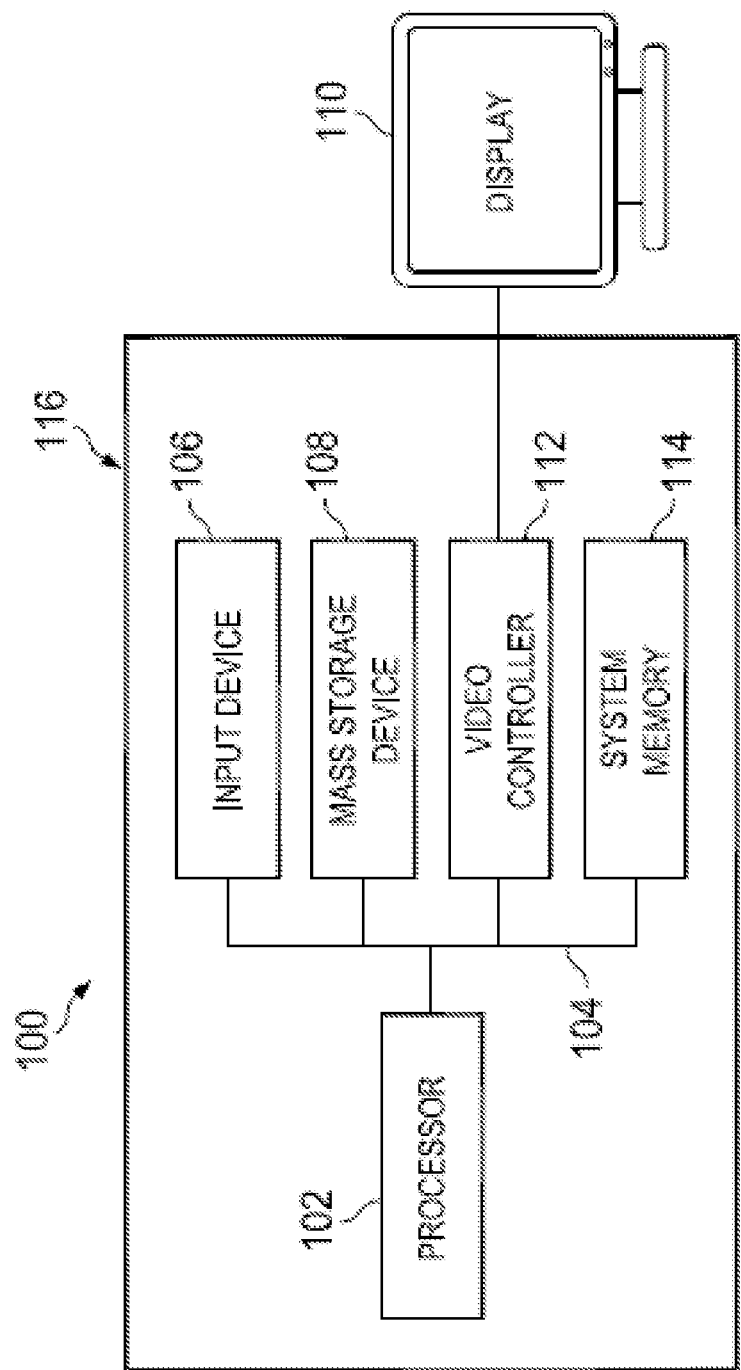
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2B:
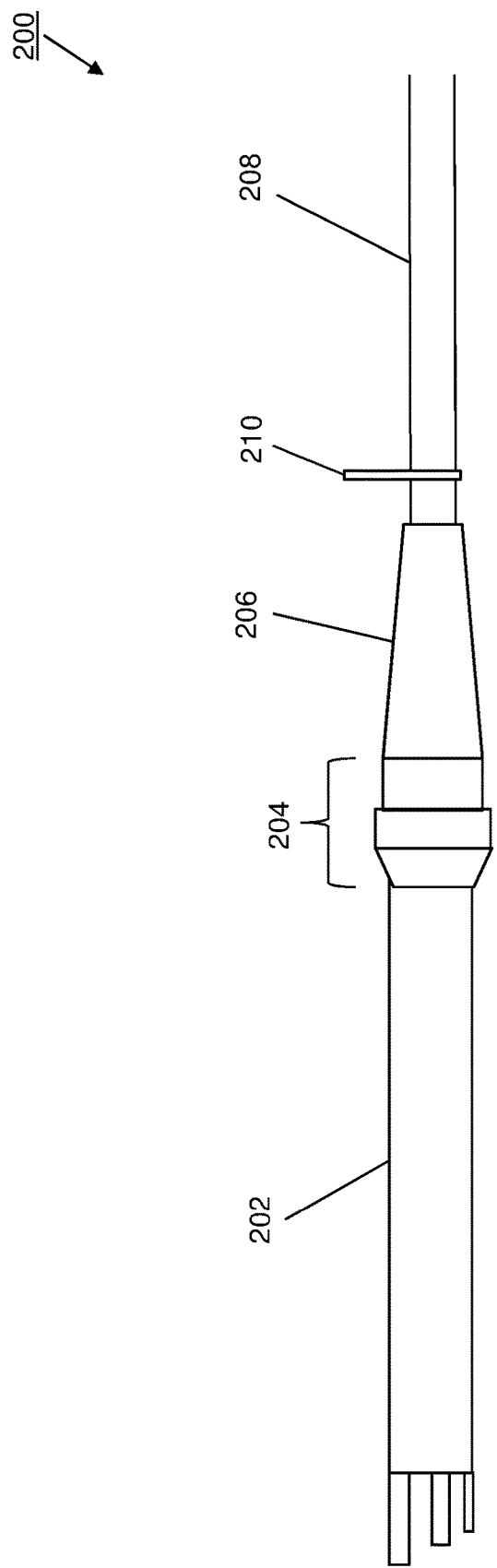
FIG. 2B is a schematic side view illustrating an embodiment of the cable of FIG. 2A.

Referring now to FIG. 2, an embodiment of a cable system 200 is illustrated. One of skill in the art in possession of the present disclosure will appreciate how the cable system 200 illustrated and discussed in the examples below is a Direct Attach Copper (DAC) cable system, but that cable systems provided in the inter-device cabling movement system 300 may include any of a variety of other cable systems (e.g., Ethernet cable systems, Fibre Optic cable systems, etc.) that are configured to operate similarly as the cable system 200 discussed below. As illustrated, the cable system 200 includes a cable connector 202 (e.g., a DAC connector) that extends from a cable handle 204, with a cable transition element 206 extending between the cable handle 204 and a cable 208. In the illustrated embodiment, a cable connector element 210 is included on the cable 208 adjacent the cable transition element 206, and in the specific example is provided by a "cable ring" that extends from the cable 208 and defines a connector element aperture 210a. In some examples, the cable connector element 210 may be configured to be coupled to the cable 208 (e.g., a "snap-on cable ring"), while in other examples the cable connector element 210 may be integrated with the cable 208 (e.g., an "integrated cable ring"). However, while illustrated and described as being located on the cable, one of skill in the art in possession of the present disclosure will appreciate how the connector element 210 may be provided on the cable connector 202, the cable handle 204, or the cable transition element 206 while remaining within the scope of the present disclosure as well.

Furthermore, while a cable connector element 210 is illustrated and described as being utilized with the inter-device cabling movement system of the present disclosure, one of skill in the art in possession of the present disclosure will appreciate how the inter-device cabling movement system of the present disclosure may be utilized with conventional cables (e.g., cables that do not include the connector element 210) while remaining within the scope of the present disclosure as well. As such, while a specific cable system 200 has been illustrated and described, one of skill in the art in possession of the present disclosure will recognize that the inter-device cabling movement system of the present disclosure may include a variety of cables having different cable components and cable component configurations while remaining within the scope of the present disclosure as well.

Figure 3A:
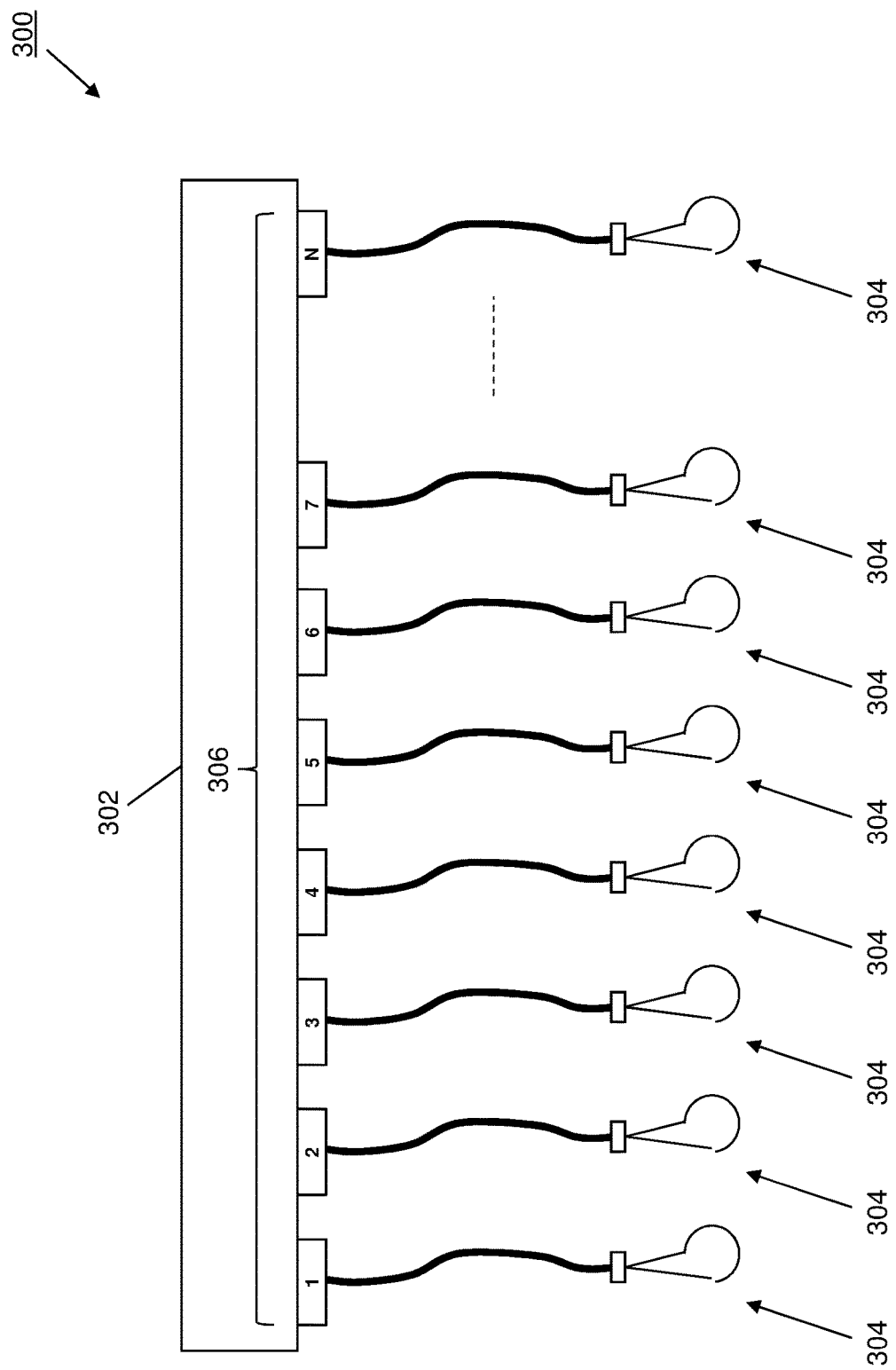
FIG. 3A is a schematic view illustrating an embodiment of an inter-device cabling movement system.
Figure 3B:
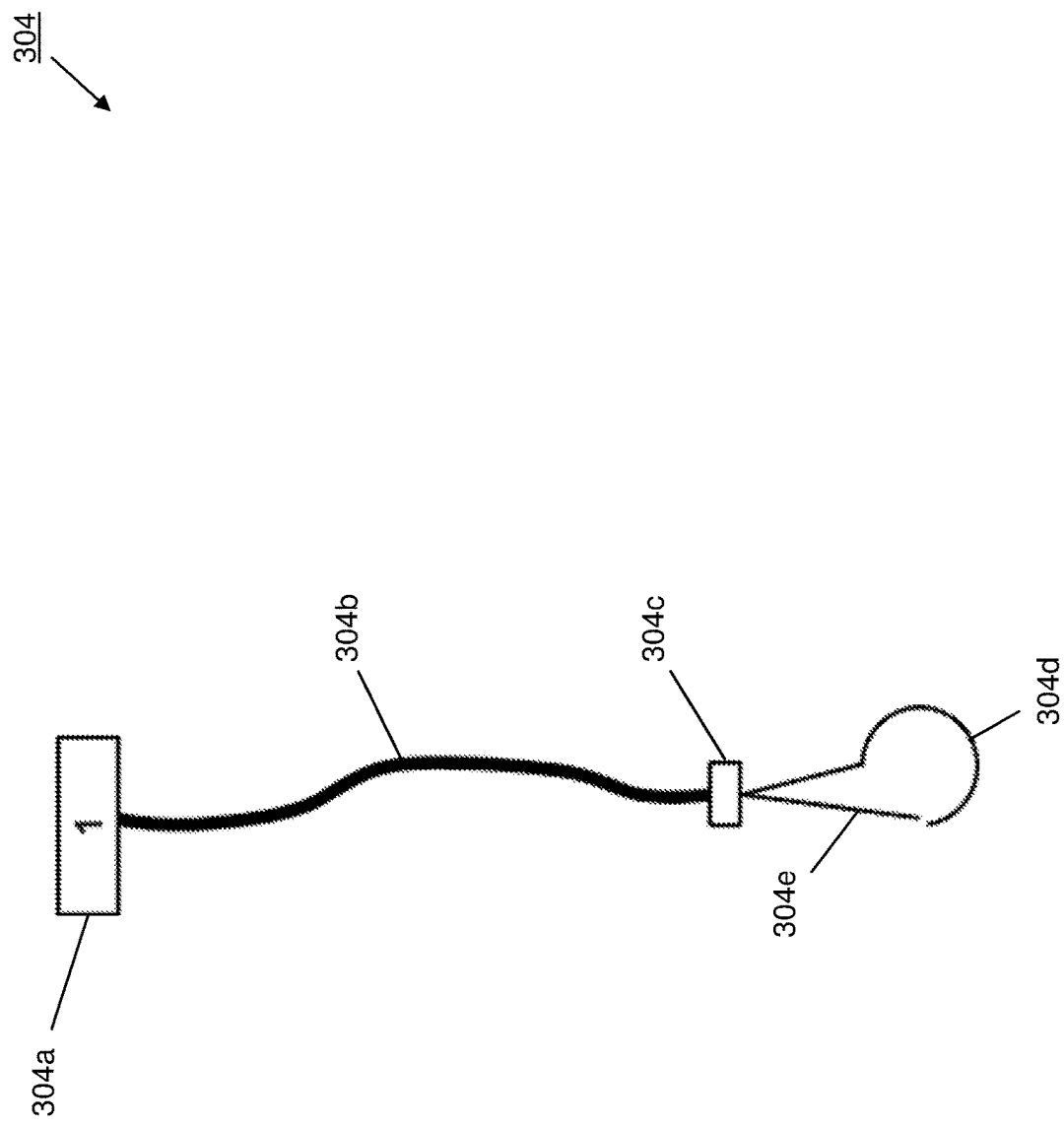
FIG. 3B is a schematic view illustrating an embodiment of a cable attachment device included on the inter-device cabling movement system of FIG. 3A.

Referring now to FIGS. 3A and 3B, an embodiment of an inter-device cabling movement system 300 is illustrated that may be used with the cable system 200 discussed above with reference to FIG. 2, as well as with conventional cable systems known in the art. In the illustrated embodiment, the inter-device cabling movement system 300 includes a base 302 having a plurality of cable attachment devices 304 extending from the base in a port identification sequence 306. In the illustrated embodiment, N cable attachment devices 304 are provided on the base 302 in a port identification sequence 306 that identifies the cable attachment devices 304 from left-to-right in FIG. 3A as including a first cable attachment device associated with a port 1 immediate adjacent a left side of the base 302, a second cable attachment device associated with a port 2 immediately adjacent the port 1, and up to an Nth cable attachment device associated with a port N immediately adjacent the right side of the base 302. In a specific example, the inter-device cabling movement system 300 may be provided for a switch device with 16 ports per row, and thus 16 cable attachment devices 204 may be included on the base 302 in a port identification sequence from 1 (on the left side of the base 302) to 16 (on the right side of the base 302), although different numbers of ports may be accommodated by the device cabling movement system 300 while remaining within the scope of the present disclosure as well. Furthermore, while the base 302 is illustrated and described below as being provided by an elongated, solid object, one of skill in the art in possession of the present disclosure will appreciate may be provided by flexible elements and/or in other configurations as long as the port identification sequence of the cable attachment devices 304 discussed below is maintained.

As illustrated in FIG. 3B, each of the cable attachment devices 304 may include a port sequence identifier 304a mounted to or included on the base 302, a flexible element 304b (e.g., a wire, cable, rope, etc.) extending from the port sequence identifier 302, a mount 304c included on a distal end of the flexible element 304b opposite the port sequence identifier 304a, a cable engagement element 304d extending from the mount 304c, and a cable securing element 304e extending from the mount 304c as well. However, while each of the cable attachment devices 304 is illustrated as being provided by a simplified carabiner-type clip on the end of a flexible rope/wire/cable, one of skill in the art in possession of the present disclosure will appreciate that the cable attachment functionality of the cable attachment devices 304 may be provided in a wide variety of manners that will fall within the scope of the present disclosure as well. As such, while a specific inter-device cabling movement system 300 has been illustrated and described, one of skill in the art in possession of the present disclosure will recognize that inter-device cabling movement systems may include a variety of components and/or component configurations for providing the functionality discussed below, while remaining within the scope of the present disclosure as well.

Figure 4:
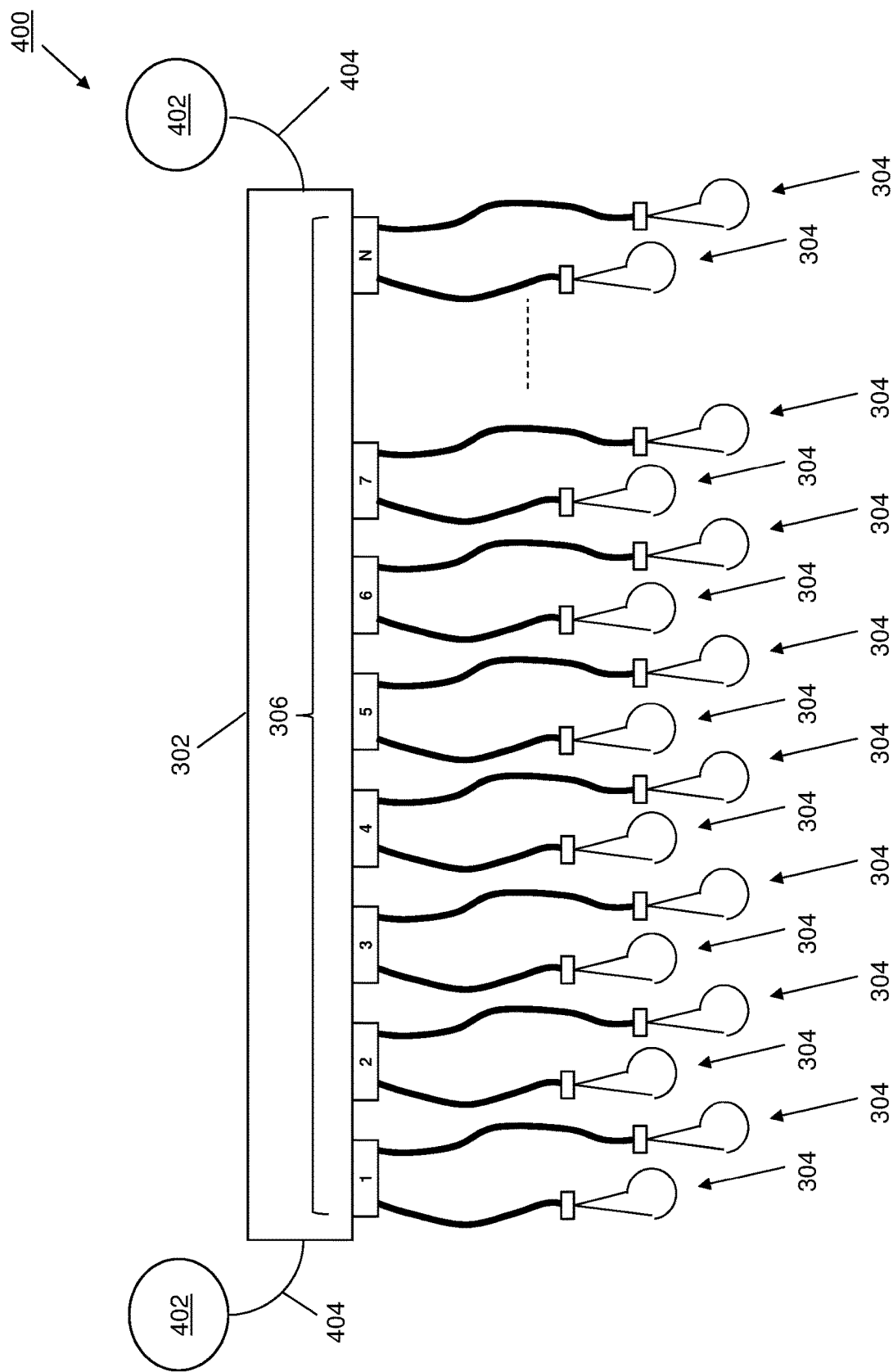
FIG. 4 is a schematic view illustrating an embodiment of an inter-device cabling movement system.

For example, with reference to FIG. 4, an embodiment of an inter-device cabling movement system 400 is illustrated that may be used with the cable system 200 discussed above with reference to FIG. 2, as well as with conventional cable systems known in the art. As will be appreciated by one of skill in the art in possession of the present disclosure, the inter-device cabling movement system 400 includes features that are similar to the inter-device cabling movement system 300 discussed above with reference to FIGS. 3A and 3B, and thus includes similar reference numbers. For example, the inter-device cabling movement system 400 includes the base 302 having the plurality of cable attachment devices 304 extending from the base in the port identification sequence 306.

However, in the illustrated embodiment, pairs of cable attachment devices 304 extends from the same port sequence identifier 304a, which one of skill in the art in possession of the present disclosure will appreciate allows the port identifier sequence to correspond to two rows of ports on a switch device. For example, the cable attachment device extending from a left side of a port sequence identifier 304a in FIG. 4 may identify a corresponding port in a top row of ports on a switch device, while the cable attachment device extending from a right side of that port sequence identifier 304a in FIG. 4 may identify a corresponding port in a bottom row of ports on a switch device. In a specific example, the inter-device cabling movement system 300 may be provided for a switch device with two rows of ports each having 16 ports per row, and thus 16 pairs of cable attachment devices 204 may be included on the base 302 in a port identification sequence from 1 (on the left side of the base 302) to 16 (on the right side of the base 302), with one cable attachment device 204 in each pair (e.g., the "left" cable attachment device extending from the port sequence identifier 304a for that pair) corresponding to a top row port, and one cable attachment device 204 in each pair (e.g., the "right" cable attachment device extending from the port sequence identifier 304a for that pair) corresponding to a bottom row port.

Furthermore, FIG. 4 also illustrates how the base 302 may include a surface connection subsystem having surface connectors 402 connected to the base 302 by support wires 404 on opposite sides of the base 302. In a specific example, the surface connectors 402 may be provided by suction cups, magnets, hooks, and/or any other element that one of skill in the art in possession of the present disclosure would recognize as being configured to connect to a surface (e.g., a rack surface or other surface known in the art) with a force that is sufficient to support the inter-device cabling movement system 300/400 when supporting cabling as discussed below. Furthermore, while not illustrated herein in detail, one or more of the cable attachment devices 304 may be configured to connect to and disconnect from the base 302 without the use of tools, with the base 302 and the cable attachment devices 304 including coupling features that are configured to engage and secure together, and disengage to allow them to be detached. As such, the cable attachment devices 304 on the base 302 may be integrated, may be attachable/detachable, may include some number of integrated cable attachment devices 304 and options to add additional attachable/detachable cable attachment devices, and/or may include be provided in other configurations in order to accommodate any port configuration on computing devices with which the inter-device cabling movement system 300/400 will be utilized.

Figure 5:
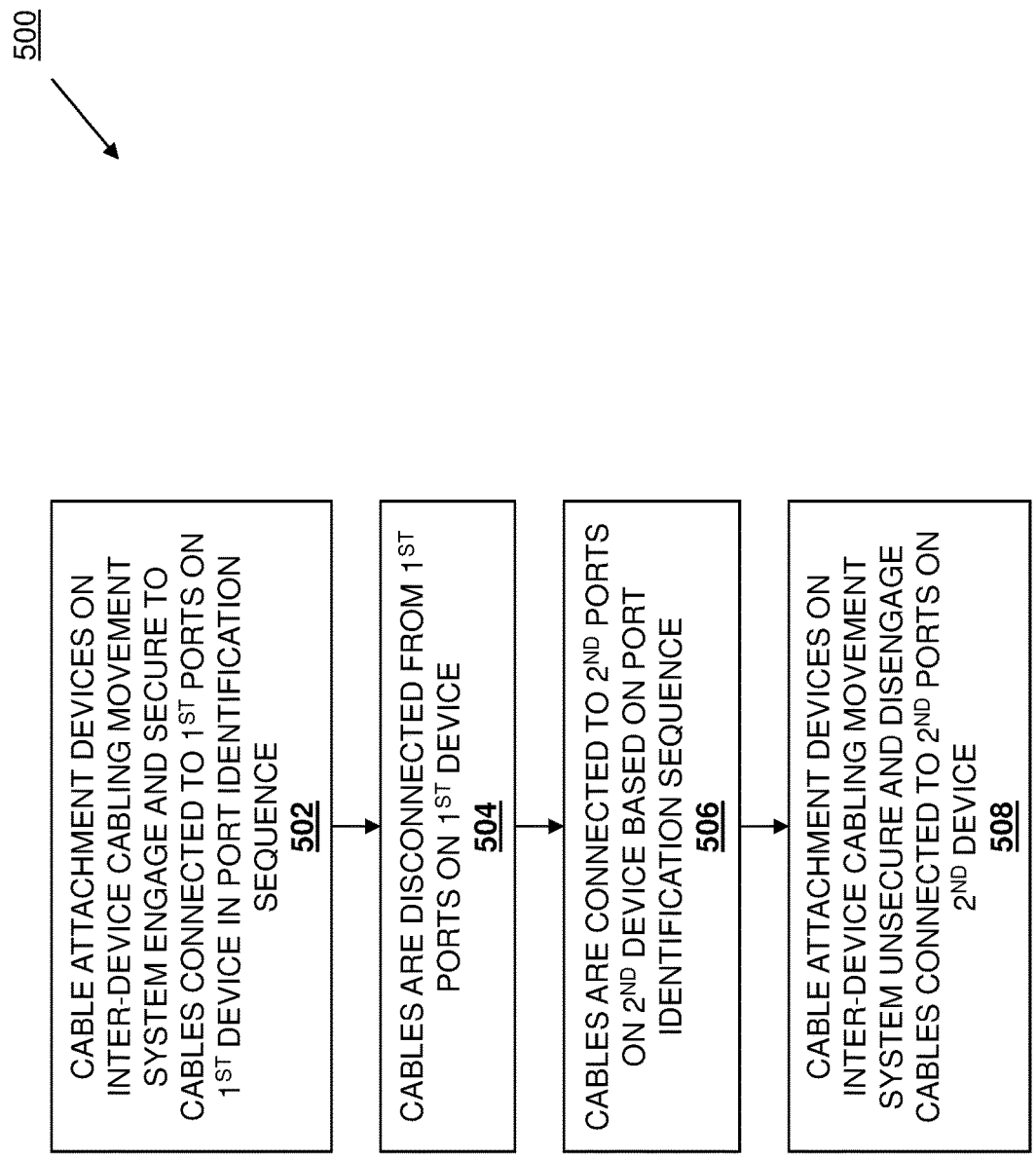
FIG. 5 is a flow chart illustrating an embodiment of a method for moving cabling between devices.

Referring now to FIG. 5, an embodiment of a method 500 for moving cabling between devices is illustrated. As discussed below, the systems and methods of the present disclosure provide for the quick and accurate movement of cabling between ports on different devices by securing the relative port sequence of the cabling connected to first ports on a first device before disconnecting that cabling from those first ports, and then using that relative port sequence to connect that cabling to second ports on a second device. For example, the inter-device cabling movement system of the present disclosure may include a base and a plurality of cable attachment devices that extend from the base in a port identification sequence. Each of the plurality of cable attachment devices includes a cable engagement element that is configured to engage a respective cable, and a cable securing element that is configured to secure the cable engagement element to the respective cable. The cable engagement elements and cable securing elements may be utilized to secure each cable attachment device to respective cables connected to first ports on a first device so that those respective cables may be disconnected from the first ports on the first device and reconnected to second ports on a second device based on the port identification sequence. As such, cabling may be moved between ports on different devices while maintaining a relative port sequence of the cabling and first ports on a first device when that cabling is moved to second ports on a second device.

Figure 6A:
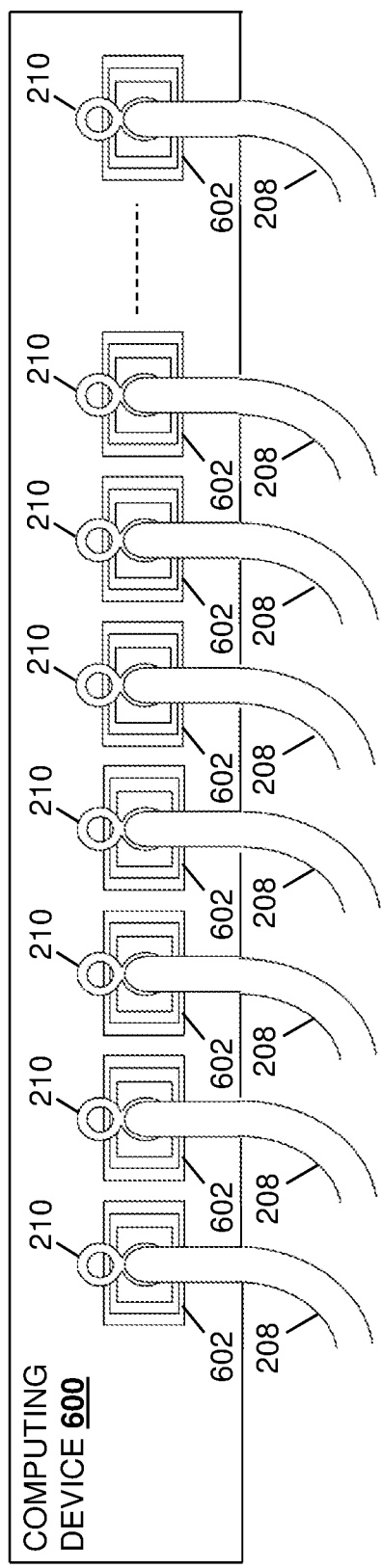
FIG. 6A is a schematic view illustrating an embodiment of a plurality of the cables of FIGS. 2A, 2B, and 2C connected to a first computing device.

With reference to FIG. 6A, during or prior to the method 500, a plurality of the cable systems 200 (discussed above with reference to FIGS. 2A-2C) may have been connected to a computing device 600 via respective ports 602 on that computing device 600. In an embodiment, the computing device 600 may be provided by the IHS 100 discussed above with reference to FIG. 1, and/or may include some or all of the components of the IHS 100, and in the specific examples below is provided by a switch device or other networking device known in the art. However, while described as being provided by a switch device, one of skill in the art in possession of the present disclosure will appreciate how the ports on the computing device 600 may be provided on other types of computing devices, or on multiple computing devices, while remaining within the scope of the present disclosure as well. As can be seen in the FIG. 6A, the ports 602 are oriented on the computing device 600 in a port sequence that, in the examples below, is provided by a single row of ports 602 numbered 1, 2, 3, 4, 5, 6, 7, and up to N from left-to-right as viewed in FIG. 6A. Continuing with the specific example provided above, the single row of ports 602 illustrated in FIG. 6A may include 16 ports. However, as described herein, computing devices utilized with the inter-device cabling movement system of the present disclosure may include multiple rows of ports (e.g., two rows (e.g., a top row and bottom row) of 16 ports each) while remaining within the scope of the present disclosure as well.

As such, the cable connector 202 on each cable system 200 may be positioned adjacent a respective port 602 on the computing device 600, and then moved towards that port such that the cable connector 202 moves into that port 602 until it engages that port in a manner that allows the cable system 200 to transmit data to and from the computing device 600. As will be appreciate by one of skill in the art in possession of the present disclosure, while every one of the ports 602 on the computing device 600 is illustrated and described below as having a cable system 200 connected thereto, one of skill in the art in possession of the present disclosure will appreciate how at least some of the ports 602 on the computing device 600 may not be connected to a cable system 200 while remaining within the scope of the present disclosure as well. Furthermore, while the inter-device cabling movement system of the present disclosure is illustrated and described as being connected to cabling/cable systems 200 that is/are already connected to a computing device 600, one of skill in the art will appreciate how the inter-device cabling movement system of the present disclosure may be used to organize cabling/cable systems 200 prior to their connection to a computing device (e.g., by connecting that cabling/those cable systems 200 to the inter-device cabling movement system of the present disclosure prior to their connection to ports on a computing system) while remaining within the scope of the present disclosure as well.

Figure 6B:
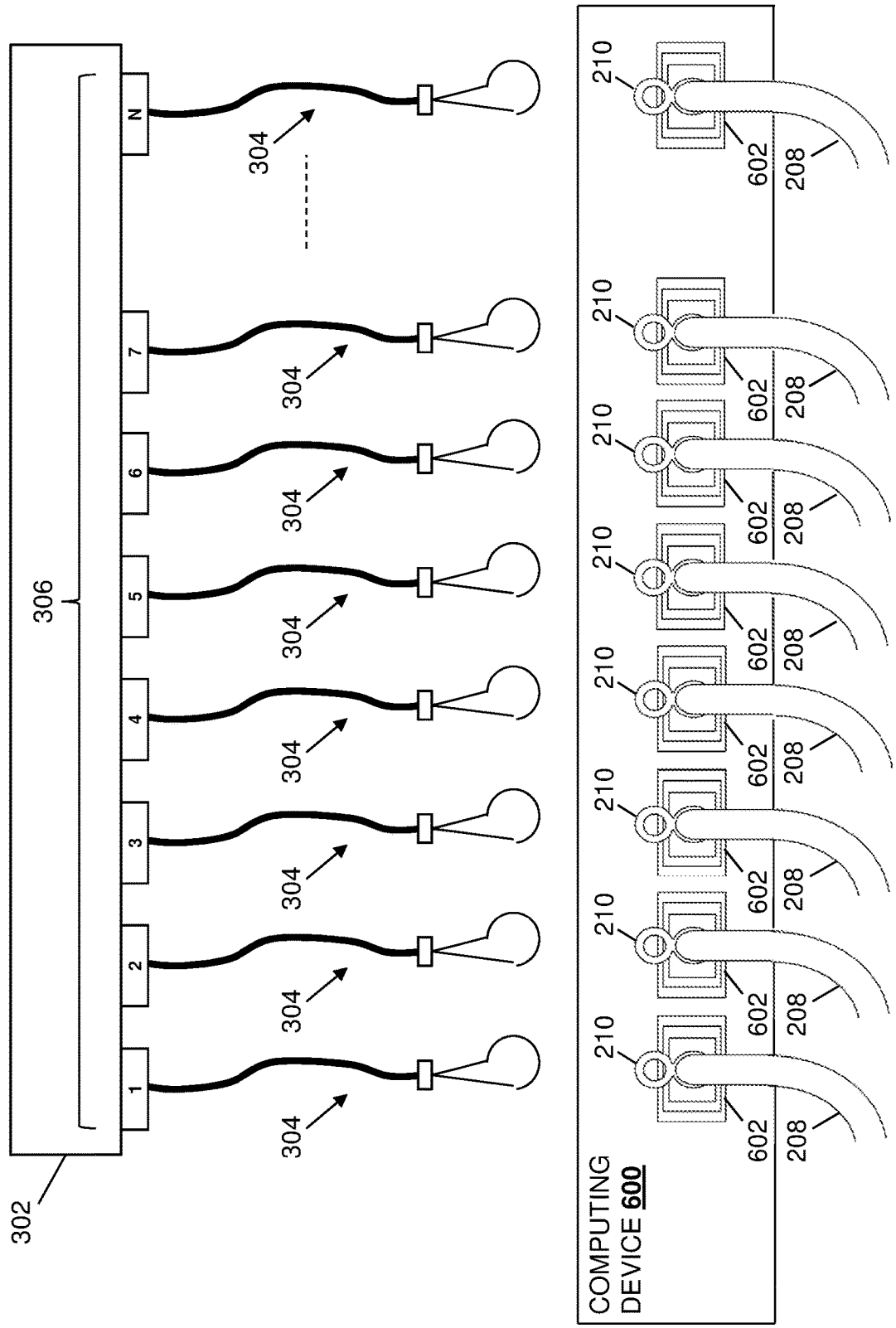
FIG. 6B is a schematic view illustrating an embodiment of the inter-device cabling movement system of FIGS. 3A and 3B being connected to the cables of FIG. 6A that are connected to the first computing device.

The method 500 begins at block 502 where cable attachment devices on an inter-device cabling movement system engage and secure to cables connected to first ports on a first device in a port identification sequence. With reference to FIG. 6B, in an embodiment of block 502, the inter-device cabling movement system 300 may be positioned adjacent the computing device 600. In specific examples, the inter-device cabling movement system 300 may be positioned adjacent the computing device 600 using the surface connectors 402 discussed above with reference to FIG. 4, and thus the surface connectors 402 may be coupled to a rack surface (e.g., when provided by suction cups, magnets, hooks, or other rack coupling elements known in the art) or other surface adjacent the computing device 600 in a manner that allows the cable attachment devices to engage and secure to the cable systems 200 as discussed below. However, while described as being positioned adjacent the computing device 600 using the surface connectors 402, one of skill in the art in possession of the present disclosure will appreciate how the inter-device cabling movement system 300 may be positioned adjacent the computing device 600 without the use of the surface connectors 402 (e.g., by setting the base 302 of the inter-device cabling movement system 300 on the rack adjacent the computing device 600) while remaining within the scope of the present disclosure as well.

Figure 6C:
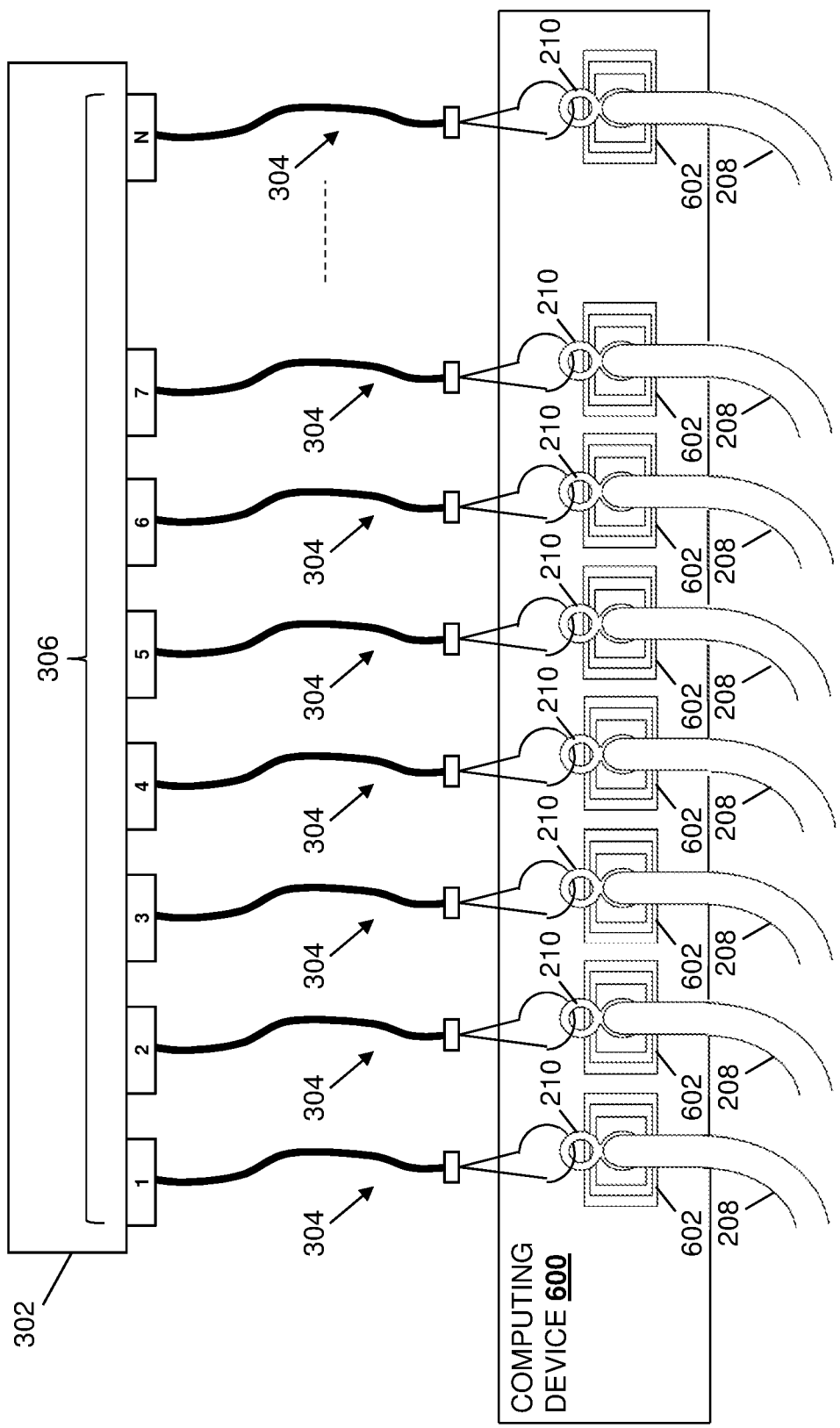
FIG. 6C is a schematic view illustrating an embodiment of the inter-device cabling movement system of FIGS. 3A and 3B connected to the cables of FIG. 6A that are connected to the first computing device.

With reference to FIG. 6C, in an embodiment of block 502, each cable attachment device 304 on the inter-device cabling movement system 300 may be engaged with and secured to a respective cable system 200 that is coupled to a respective port on the computing device 600. As can be seen in the specific example illustrated in FIGS. 6B and 6C, the inter-device cabling movement system 300 may have been positioned adjacent the computing device 600 such that respective port sequence identifiers 304a oriented in the port identification sequence on the base 302 (e.g., that identify a port sequence 1, 2, 3, 4, 5, 6, 7, and up to N from left-to-right in FIGS. 6B and 6C) are positioned adjacent ports 602 on the computing device 600 that correspond to that port identification sequence (e.g., a single row of ports 602 numbered 1, 2, 3, 4, 5, 6, 7, and up to N from left-to-right as viewed in FIG. 6A). As such, the cable attachment device 304 having the port sequence identifier 304a corresponding to "1" in the port sequence may be positioned adjacent the port 602 on the computing device 600 numbered "1", the cable attachment device 304 having the port sequence identifier 304a corresponding to "2" in the port sequence may be positioned adjacent the port 602 on the computing device 600 numbered "2", and so on up to the cable attachment device 304 having the port sequence identifier 304a corresponding to "N" in the port sequence positioned adjacent the port 602 on the computing device 600 numbered "N".

Referring to FIGS. 3B and 6C, the engagement and securing of the cable attachment devices 304 to the cable systems 200 may include a user of the inter-device cabling system 300 moving the mount 304c, cable engagement element 304d, and cable securing element 304e on that cable attachment device 304 towards the cable connector element 210 on the cable system 200 connected to the port 602 adjacent that cable attachment device 304 such that the cable engagement element 304d engages (e.g., "hooks" in this example) the cable connector element 210 via its connector element aperture 210a. As will be appreciated by one of skill in the art in possession of the present disclosure, in the specific examples illustrated and described herein that provide the cable engagement element 304d and cable securing element 304e in a simplified carabiner-type clip, the engagement of the cable engagement element 304d and the cable connector element 210 may include engaging and moving the cable securing element 304e (relative to the cable engagement element 304d) using the cable connector element 210 while the cable engagement element 304d hooks the cable connector element 210 via its connector element aperture 210a in order to allow the cable connector element 210 to enter the space between the cable engagement element 304d and cable securing element 304e, which allows the cable securing element 304e to return to an unmoved position that secures the cable connector element 210 in the space between the cable engagement element 304d and cable securing element 304e, as illustrated in FIG. 6C.

However, while a specific example of the engagement and securing of a simplified carabiner-type clip embodiment of the cable attachment device 304 to a cable connector element 210 on the cable system 200 is illustrated and described, one of skill in the art in possession of the present disclosure will appreciate how a wide variety of different cable attachment devices may be connected to a wide variety of cable systems while remaining within the scope of the present disclosure. For example, when conventional cable systems (e.g., without the cable connector element 210 described above) are used with the inter-device cabling system 300 of the present disclosure, the simplified carabiner-type clip embodiment of the cable attachment device 304 may be engaged with and secure to the cable 208 by engaging and moving the cable securing element 304e (relative to the cable engagement element 304d) using the cable 208 while the cable engagement element 304d hooks the cable 208 in order to allow the cable 208 to enter the space between the cable engagement element 304d and cable securing element 304e, which allows the cable securing element 304e to return to an unmoved position that secures the cable 208 in the space between the cable engagement element 304d and cable securing element 304e.

In other example, other embodiment of the cable attachment device 304 may include hooks (e.g., similar to the cable engagement element 304d discussed above) that secure to the cable system 200 without the cable securing element 304e by simply moving the cable engagement element 304d into the cable connector element 210 via its connector element aperture 210a to engage and secure the cable connector element 210 to the cable engagement element 304d. In yet other examples, other embodiment of the cable attachment device 304 may include straps (e.g., "VELCRO" straps, adhesive straps, etc.) that secure to the cable system 200 by wrapping the strap around the cable 208 to secure the cable 208 to the cable attachment device 304. In yet other examples, other embodiment of the cable attachment device 304 may include clips that secure to the cable system 200 by clipping the cable 208 to secure the cable 208 to the cable attachment device 304. As such, one of skill in the art in possession of the present disclosure will appreciate how a wide variety of techniques and elements may be utilized to engage and secure to each cable system 200 in order to maintain the port sequence of the cable system 200/port 602 connections illustrated in FIGS. 6A, 6B, and 6C.

Furthermore, while not illustrated or described herein in detail, one of skill in the art in possession of the present disclosure will appreciate how the cable attachment devices 304 on the inter-device cabling movement system 400 discussed above with reference to FIG. 4 may be connected to cable systems 200 that are connected to both a top row of ports and a bottom row of ports on a computing device. Continuing with the specific example above in which pairs of cable attachment devices 304 extends from the same port sequence identifier 304a to allow the port identifier sequence on the inter-device cabling movement system 400 to corresponds to two rows of ports, the cable attachment device 304 extending from a left side of each port sequence identifier 304a may be connected to a cable system 200 connected to a corresponding port in a top row of ports 602 on the computing device 600, while the cable attachment device 304 extending from a right side of each port sequence identifier 304a may be connected to a cable system 200 connected to a corresponding port in a bottom row of ports 602 on the computing device 600.

Figure 6D:
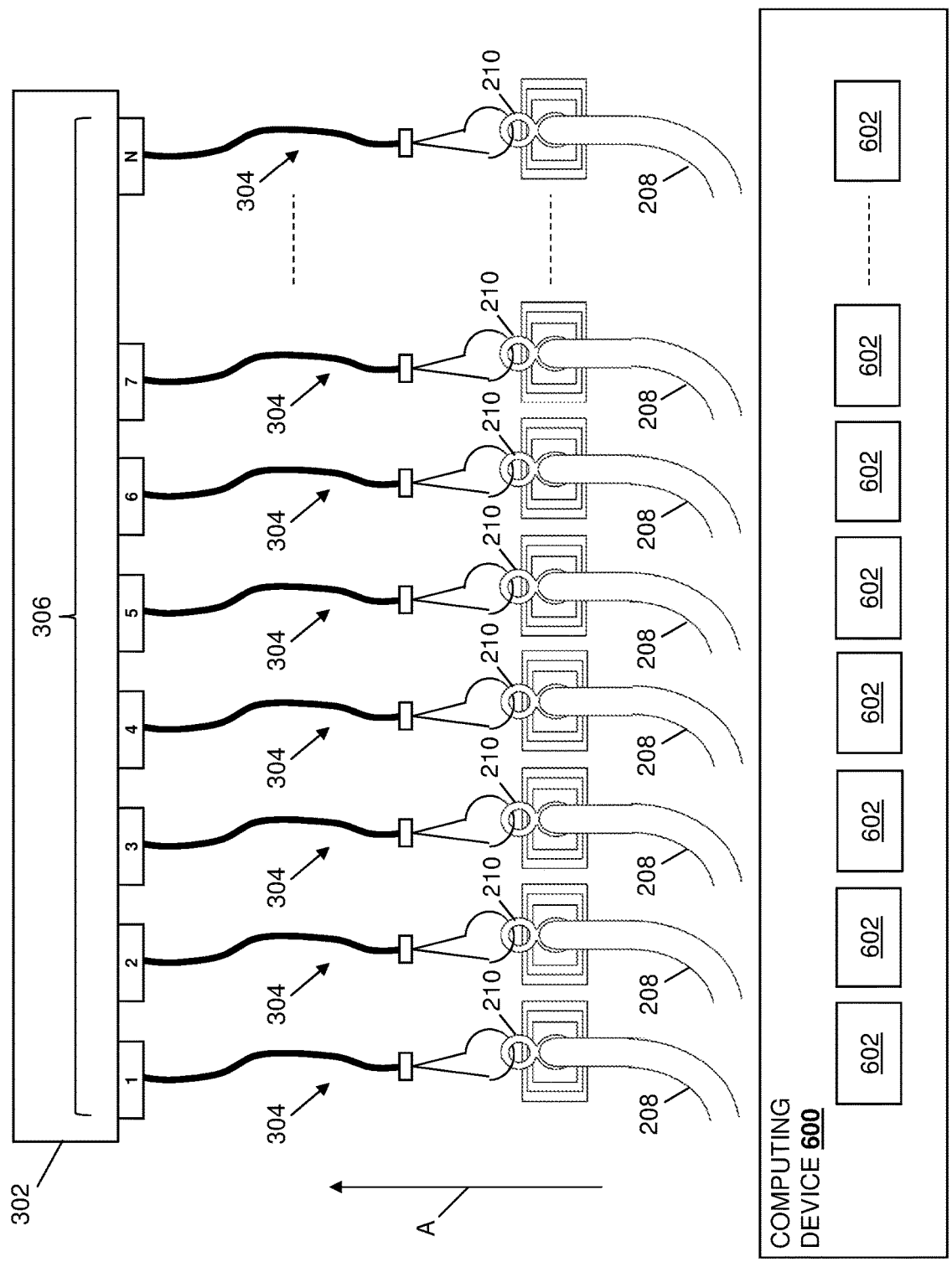
FIG. 6D is a schematic view illustrating an embodiment of the inter-device cabling movement system of FIGS. 3A and 3B connected to the cables of FIG. 6A that have been disconnected from the first computing device.

The method 500 then proceeds to block 504 where the cables are disconnected from the first ports on the first device. With reference to FIG. 6D, in an embodiment of block 504, each of the cable systems 200 may be disconnected from their respective ports 602 on the computing device 600 in order to allow the inter-device cabling movement system 300 and the cable systems 200 connected to respective cable attachment devices 304 to be moved in a direction A relative to the computing device 600. For example, the user of the inter-device cabling movement system 300 may disconnect the cable connector 202 on each cable system 200 from each respective port 602 on the computing device 600, which allows the relative movement of the inter-device cabling movement system 300/cable systems 200 and the computing device 600 in the direction A. In a specific example of the relative movement A, the computing device 600 may have failed, become unavailable, or otherwise be in a condition for replacement, and with the inter-device cabling movement system 300 positioned adjacent the computing device 600 using the surface connectors 402 (e.g., coupled to a rack surface), the computing device 600 may be removed from the rack. In another specific example of the relative movement A, the computing device 600 may have failed, become unavailable, or otherwise be in a condition for replacement, and the inter-device cabling movement system 300 with the connected cable systems 200 may be moved and positioned away from the computing device 600 using the surface connectors 402 (e.g., coupled to a rack surface) in order to allow the computing device 600 to be removed from the rack. However, while a few specific examples have been provided, one of skill in the art in possession of the present disclosure will appreciate how the computing device 600 and the cable systems 200 disconnected therefrom may be moved relative to each other in a variety of manners while remaining within the scope of the present disclosure as well.

Figure 7A:
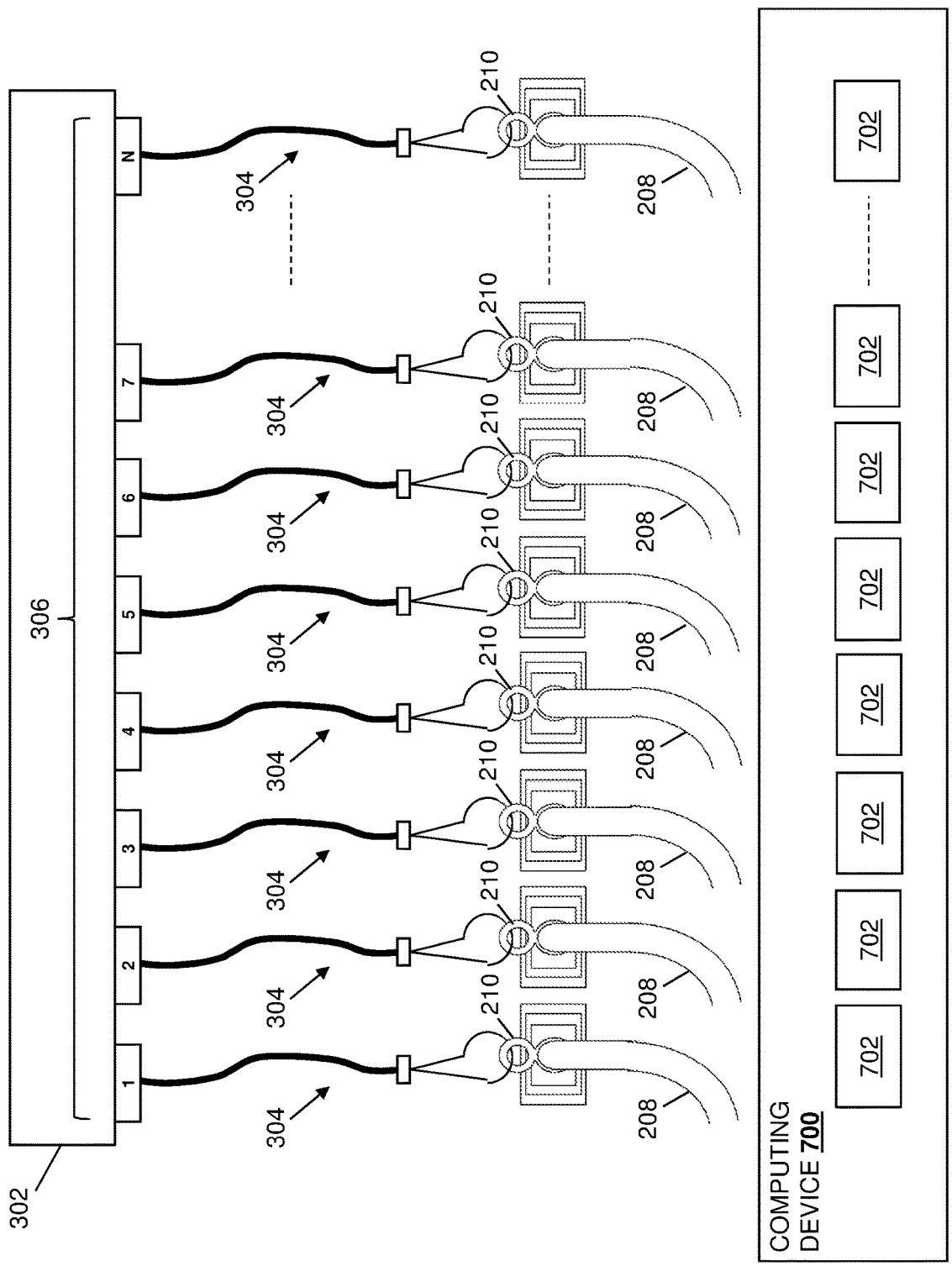
FIG. 7A is a schematic view illustrating an embodiment of the inter-device cabling movement system of FIGS. 3A and 3B connected to the cables of FIG. 6A that are being connected to a second computing device.
Figure 7B:
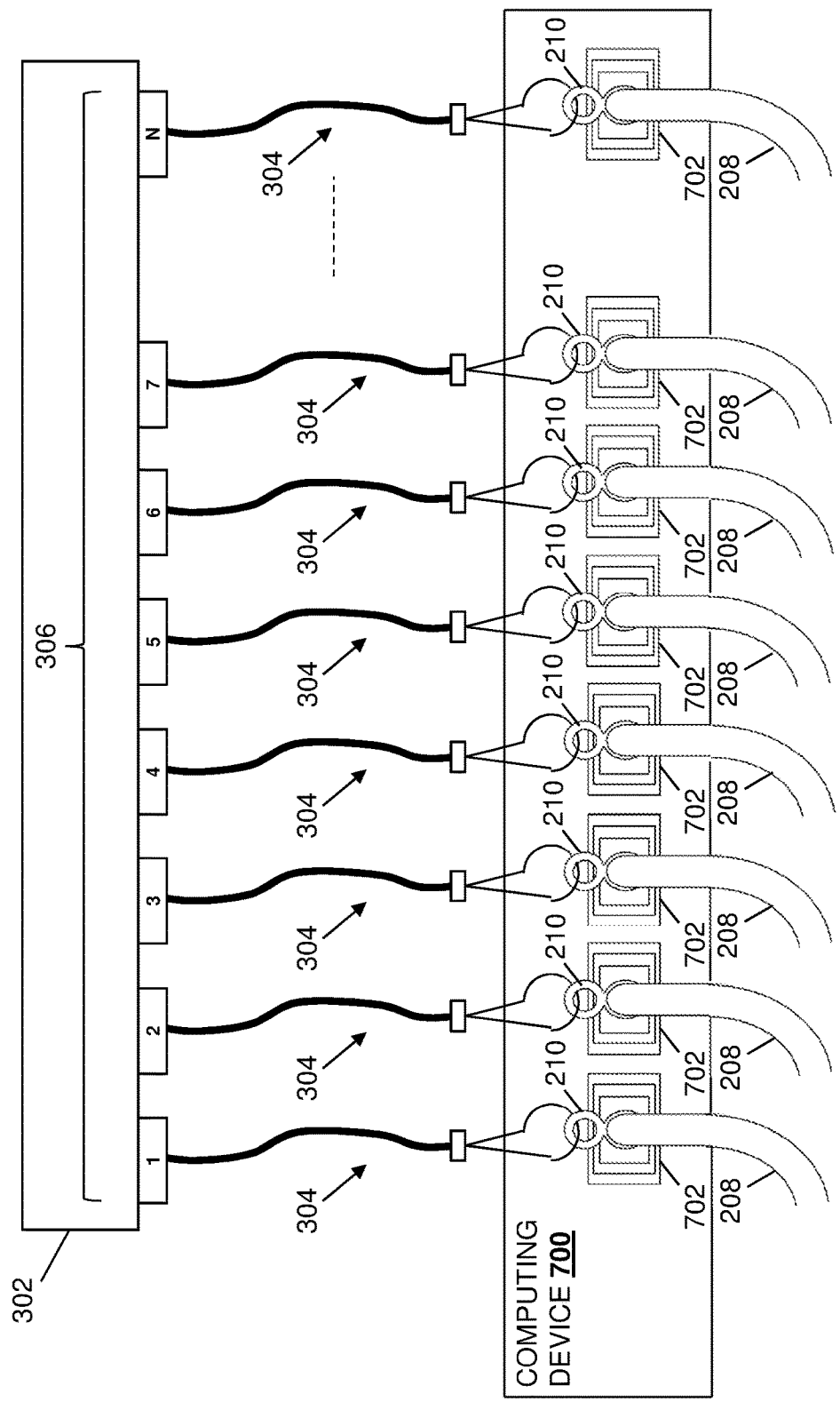
FIG. 7B is a schematic view illustrating an embodiment of the inter-device cabling movement system of FIGS. 3A and 3B connected to the cables of FIG. 6A that are connected to the second computing device.

The method 500 then proceeds to block 506 where the cables are connected to second ports on second device. With reference to FIGS. 7A and 7B, in an embodiment of block 506, the inter-device cabling movement system 300 with the connected cable systems 200 may be positioned adjacent a computing device 700 that may have been provided to replace the computing device 600 that failed, became unavailable, or was otherwise in a condition for replacement. In an embodiment, the computing device 700 may be provided by the IHS 100 discussed above with reference to FIG. 1, and/or may include some or all of the components of the IHS 100, and in the specific examples below is provided by a switch device or other networking device known in the art. In a specific example, the computing device 700 may be similar to the computing device 600 by having its ports 702 configured and oriented in a manner that is similar to the ports 602 on the computing device 600. However, while described as being provided by a switch device, one of skill in the art in possession of the present disclosure will appreciate how the ports on the computing device 700 may be provided on other types of computing devices, or on multiple computing devices, while remaining within the scope of the present disclosure as well.

In a specific example, with the inter-device cabling movement system 300 coupled to a rack surface using the surface connectors 402, the computing device 700 may be positioned in a rack in the previous location of the computing device 600. In another specific example, the inter-device cabling movement system 300 with the connected cable systems 200 may be moved and positioned adjacent the computing device 700 using the surface connectors 402 (e.g., coupled to a rack surface) in order to allow the cable systems 200 to be connected to the computing device 700. However, while a few specific examples have been provided, one of skill in the art in possession of the present disclosure will appreciate how the computing device 700 and the cable systems 200 connected to the inter-device cabling movement system 300 may be positioned adjacent each other in a variety of manners while remaining within the scope of the present disclosure as well.

As can be seen, the inter-device cabling movement system 300 may be positioned adjacent the computing device 700 such that respective port sequence identifiers 304a oriented in the port identification sequence on the base 302 (e.g., that identify a port sequence 1, 2, 3, 4, 5, 6, 7, and up to N from left-to-right in FIGS. 7A and 7B) are positioned adjacent ports 702 on the computing device 700 that correspond to that port identification sequence (e.g., a single row of ports 702 numbered 1, 2, 3, 4, 5, 6, 7, and up to N from left-to-right as viewed in FIGS. 7A and 7B). As such, the cable attachment device 304 having the port sequence identifier 304a corresponding to "1" in the port sequence may be positioned adjacent the port 702 on the computing device 700 numbered "1", the cable attachment device 304 having the port sequence identifier 304a corresponding to "2" in the port sequence may be positioned adjacent the port 702 on the computing device 700 numbered "2", and so on up to the cable attachment device 304 having the port sequence identifier 304a corresponding to "N" in the port sequence positioned adjacent the port 702 on the computing device 700 numbered "N"

As such, the cable connector 202 on each cable system 200 may be positioned adjacent a respective port 702 on the computing device 700, and then moved towards that port such that the cable connector 202 moves into that port 702 until it engages that port in a manner that allows the cable system 200 to transmit data to and from the computing device 700. Thus, with continued reference to FIG. 7B, the cable system 200 connected to the cable attachment device 304 having the port sequence identifier 304a corresponding to "1" in the port sequence is connected to the port 702 on the computing device 700 numbered "1", the cable system 200 connected to the cable attachment device 304 having the port sequence identifier 304a corresponding to "2" in the port sequence is connected to the port 702 on the computing device 700 numbered "2", and so on up to the cable system 200 connected to the cable attachment device 304 having the port sequence identifier 304a corresponding to "N" in the port sequence connected to the port 702 on the computing device 700 numbered "N". As will be appreciated by one of skill in the art in possession of the present disclosure, while every one of the ports 702 on the computing device 700 is illustrated and described below as having a cable system 200 connected thereto, at least some of the ports 702 on the computing device 700 may not be connected to a cable system 200 at block 506 while remaining within the scope of the present disclosure as well.

Furthermore, as described herein, computing devices utilized with the inter-device cabling movement system of the present disclosure may include multiple rows of ports (e.g., two rows (e.g., a top row and bottom row) of 16 ports each), and thus cable systems 200 connected to the inter-device cabling movement system 400 discussed above with reference to FIG. 4 may be connected to multiple rows of ports on a computing device while remaining within the scope of the present disclosure as well. Continuing with the specific example above in which pairs of cable attachment devices 304 extends from the same port sequence identifier 304a to allow the port identifier sequence on the inter-device cabling movement system 400 to corresponds to two rows of ports, the cable system 200 connected to the cable attachment device 304 extending from a left side of each port sequence identifier 304a may be connected to a corresponding port in a top row of ports 702 on the computing device 700, while the cable system 200 connected to the cable attachment device 304 extending from a right side of each port sequence identifier 304a may be connected to a corresponding port in a bottom row of ports 702 on the computing device 700.

Figure 7D:
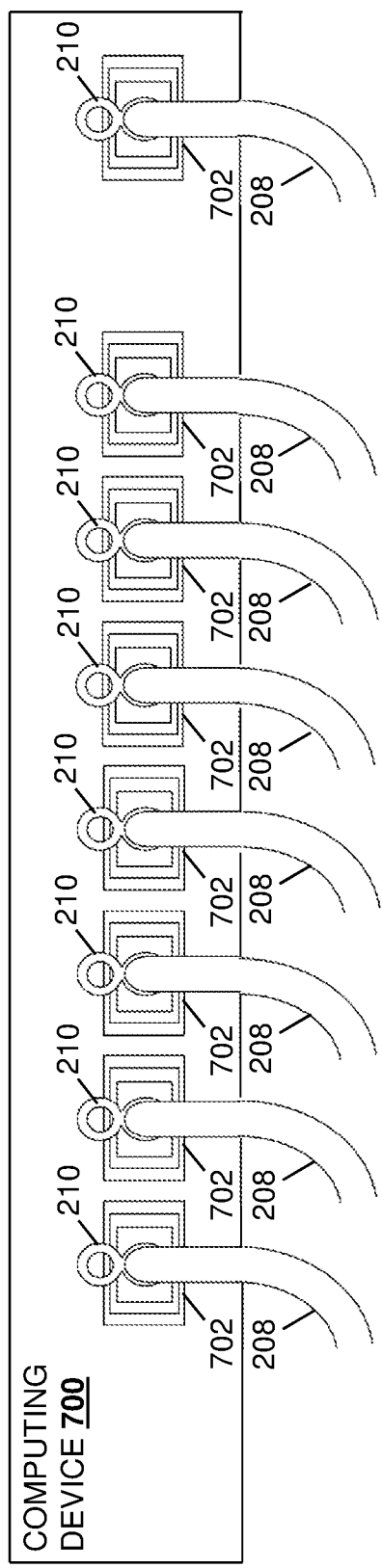
FIG. 7D is a schematic view illustrating an embodiment of the cables of FIG. 6A connected to the second computing device.

The method 500 then proceeds to block 508 where the cable attachment devices on an inter-device cabling movement system unsecure and disengage the cables connected to the second ports on the second device. Referring to FIGS. 3B, 7B, 7C, and 7D, in an embodiment of block 508, the unsecuring and disengagement of the cable attachment devices 304 from the cable systems 200 may include a user of the inter-device cabling system 300 moving the mount 304c, cable engagement element 304d, and cable securing element 304e on that cable attachment device 304 away from the cable connector element 210 on the cable system 200 connected to the port 702 such that the cable securing element 304e engages the cable connector element 210 and moves to allow the cable engagement element 304d to disengage (e.g., "unhook" in this example) the connector element aperture 210a on the cable connector element 210. As will be appreciated by one of skill in the art in possession of the present disclosure, in the specific examples illustrated and described herein that provide the cable engagement element 304d and cable securing element 304e in a simplified carabiner-type clip, the engagement of the cable securing element 304e and the cable connector element 210 may move the cable securing element 304e (relative to the cable engagement element 304d) using the cable connector element 210 while the cable engagement element 304d unhooks the connector element aperture 210a on the cable connector element 210 in order to allow the cable connector element 210 to leave the space between the cable engagement element 304d and cable securing element 304e and disengage the cable engagement element 304d, as illustrated in FIG. 7C, so that the inter-device cabling movement system 300 may be moved in a direction B away from the computing device 700, as illustrated in FIG. 7D.

However, while a specific example of the unsecuring and disengagement of a simplified carabiner-type clip embodiment of the cable attachment device 304 from a cable connector element 210 on the cable system 200 is provided, one of skill in the art in possession of the present disclosure will appreciate how a wide variety of different cable attachment devices may be disconnected from a wide variety of cable systems while remaining within the scope of the present disclosure. For example, when conventional cable systems (e.g., without the cable connector element 210 described above) are used with the inter-device cabling system 300 of the present disclosure, the simplified carabiner-type clip embodiment of the cable attachment device 304 may be unsecured and disengaged from the cable 208 by engaging and moving the cable securing element 304e (relative to the cable engagement element 304d) using the cable 208 while the cable engagement element 304d unhooks the cable 208 in order to allow the cable 208 to leave the space between the cable engagement element 304d and cable securing element 304e, which allows the cable 208 to disengage the cable engagement element 304d.

In other example, other embodiment of the cable attachment device 304 may include hooks (e.g., similar to the cable engagement element 304d discussed above) that unsecure and disengage from the cable system 200 without the cable securing element 304e by simply moving the cable engagement element 304d out of the connector element aperture 210a on the cable connector element 210. In yet other examples, other embodiment of the cable attachment device 304 may include straps (e.g., "VELCRO" straps, adhesive straps, etc.) that unsecure and disengage from the cable system 200 by unwrapping the strap from around the cable 208 to unsecure and disengage the cable 208 from the cable attachment device 304. In yet other examples, other embodiment of the cable attachment device 304 may include clips that unsecure and disengage from the cable system 200 by unclipping the cable 208 to unsecure and disengage the cable 208 from the cable attachment device 304. As such, one of skill in the art in possession of the present disclosure will appreciate how a wide variety of techniques and elements may be utilized to unsecure and disengage each cable system 200 in order to allow the inter-device cabling movement system 300 away from the computing device 700.

As such, one of skill in the art in possession of the present disclosure will recognize how the inter-device cabling movement system of the present disclosure allows cabling to be accurately moved between switch devices by attaching its cable attachment devices to cabling currently connected to first ports on a first switch device by matching the port sequence identification on the inter-device cabling movement system with the port sequence of the first ports on the first switch device (e.g., attaching a cable attachment device associated with port sequence identifier "1" to a cable system connected to port 1 on the first switch device, attaching a cable attachment device associated with port sequence identifier "2" to a cable system connected to port 2 on the first switch device, and so on). Each of the cables may then be disconnected from the first switch device while remaining connected to the inter-device cabling movement system, and those cables may then be connected to second ports on a second switch device by matching the port sequence identification on the inter-device cabling movement system with the port sequence of the second ports on the second switch device (e.g., attaching a cable system connected to a cable attachment device associated with port sequence identifier "1" to a port 1 on the second switch device, attaching a cable system connected to a cable attachment device associated with port sequence identifier "2" to a port 2 on the second switch device, and so on), ensuring that the new connections of the cabling to the second switch device match the previous connections of the cabling to the first switch device.

Thus, systems and methods have been described that provide for the quick and accurate movement of cabling between ports on different switch devices by securing the relative port sequence of the cabling connected to first ports on a first switch device before disconnecting that cabling from those first ports, and then using that relative port sequence to connect that cabling to second ports on a second switch device. For example, the inter-switch-device cabling movement system of the present disclosure may include a base and a plurality of cable attachment devices that extend from the base in a port identification sequence. Each of the plurality of cable attachment devices includes a cable engagement element that is configured to engage a respective cable, and a cable securing element that is configured to secure the cable engagement element to the respective cable. The cable engagement elements and cable securing elements may be utilized to secure each cable attachment device to respective cables connected to first ports on a first switch device so that those respective cables may be disconnected from the first ports on the first switch device and reconnected to second ports on a second switch device based on the port identification sequence. As such, cabling may be moved between ports on different switch devices while maintaining a relative port sequence of the cabling and first ports on a first switch device when that cabling is moved to second ports on a second switch device, eliminating issues even when cables are unlabeled or labeled incorrectly, allowing quicker verification of the connections, reducing operating costs, reducing switch device replacement times, and/or providing other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for moving cabling between devices, comprising:
   engaging, by a respective cable engagement element on each of a plurality of cable attachment devices that extend from a base in a port identification sequence, respective cables that are connected to respective first ports on a first device;
   securing, by a respective cable securing element on each of the plurality of cable attachment devices, each respective cable engagement element to each respective cable;
   disconnecting the respective cables from the respective first ports on the first device;
   connecting the respective cables to respective second ports on a second device based on the port identification sequence;
   unsecuring, by each respective cable securing element on each of the plurality of cable attachment devices, each respective cable engagement element from each respective cable; and
   disengaging, by each respective cable engagement element on each of the plurality of cable attachment devices, each respective cable that is connected to one of the respective second ports on the second device.

2. The method of claim 1, further comprising:
   identifying, by port sequence identifiers that are included on the base, the port identification sequence.

3. The method of claim 1, wherein each of the plurality of cable attachment devices includes a flexible element that connects the cable engagement element and the cable securing element to the base.

4. The method of claim 1, wherein the plurality of cable attachment devices include a first subset of top row cable attachment devices that extend from the base in a top row port identification sequence, and a second subset of bottom row cable attachment devices that extend from the base in a bottom row port identification sequence.

5. The method of claim 1, further comprising:
   coupling, via a surface connection subsystem that is included on the base, the base to a surface.

6. The method of claim 1, further comprising:
   connecting, by the base, to at least one of the plurality of cable attachment devices without the use of a tool; and disconnecting, by the base, from at least one of the plurality of cable attachment devices without the use of a tool.

7. The method of claim 1, further comprising:

engaging, by a respective connector member that extends from each respective cable, a respective cable engagement element on a respective cable attachment device.

* * * * *